United States Patent
Nomura

(10) Patent No.: US 9,352,929 B2
(45) Date of Patent: May 31, 2016

(54) WINDING DEVICE

(75) Inventor: Shigeaki Nomura, Hashima (JP)

(73) Assignees: Fuji Seiko Co., Ltd. (JP); Fuji Shoji Co., Ltd. (JP)

( * ) Notice: Subject to any disclaimer, the term of this patent is extended or adjusted under 35 U.S.C. 154(b) by 0 days.

(21) Appl. No.: 14/402,046

(22) PCT Filed: May 30, 2012

(86) PCT No.: PCT/JP2012/063957
§ 371 (c)(1),
(2), (4) Date: Nov. 18, 2014

(87) PCT Pub. No.: WO2013/179420
PCT Pub. Date: Dec. 5, 2013

(65) Prior Publication Data
US 2015/0129707 A1  May 14, 2015

(51) Int. Cl.
*B21C 47/02* (2006.01)
*B65H 54/00* (2006.01)
*B29D 30/50* (2006.01)
*B29D 30/48* (2006.01)
*B21F 17/00* (2006.01)

(52) U.S. Cl.
CPC .............. *B65H 54/00* (2013.01); *B21F 17/00* (2013.01); *B29D 30/48* (2013.01); *B29D 30/50* (2013.01); *B29D 2030/487* (2013.01)

(58) Field of Classification Search
CPC .. B29D 2030/487; B29D 30/48; B29D 30/50; B65H 54/14; B65H 54/04
See application file for complete search history.

(56) References Cited

U.S. PATENT DOCUMENTS

| | | | | |
|---|---|---|---|---|
| 3,057,566 A | * | 10/1962 | Braden | B29D 30/48 137/83 |
| 4,097,321 A | * | 6/1978 | Kelly | B29D 30/50 156/136 |
| 5,141,033 A | * | 8/1992 | Rausch | B29D 30/48 140/88 |
| 6,363,988 B1 | | 4/2002 | Yasufuku et al. | |
| 2003/0116254 A1 | | 6/2003 | Sata | |
| 2006/0070696 A1 | | 4/2006 | Takeuchi et al. | |

FOREIGN PATENT DOCUMENTS

| | | |
|---|---|---|
| CN | 1760021 A | 4/2006 |
| JP | 59-138016 | 8/1984 |
| JP | H0258008 B2 | 12/1990 |
| JP | 2000136068 A | 5/2000 |
| JP | 2000-343913 A | 12/2000 |
| JP | 2000-355056 | 12/2000 |
| JP | 2003-154581 A | 5/2003 |

(Continued)

OTHER PUBLICATIONS

PCT International Preliminary Report on Patentability for PCT/JP2012/063957, mailed Aug. 28, 2012, pp. 1-4.

(Continued)

*Primary Examiner* — Emmanuel M Marcelo
(74) *Attorney, Agent, or Firm* — Tarolli, Sundheim, Covell & Tummino LLP

(57) ABSTRACT

A winding device is provided with a rotor that rotates past an inner side and an outer side of an annular bead ring, which is fed in a circumferential direction, while holding a binding cord to wind the binding cord around the bead ring. The rotor includes a pushing member that elastically pushes the binding cord against the bead ring.

2 Claims, 5 Drawing Sheets

(56) References Cited

FOREIGN PATENT DOCUMENTS

| | | | | |
|---|---|---|---|---|
| JP | 2004-345311 | 12/2004 | | |
| JP | 2008-018433 A | 1/2008 | | |
| JP | 2008-168927 A | 7/2008 | | |
| JP | WO 2013145192 A1 * | 10/2013 | ............. | B29D 30/48 |
| WO | WO 2011/030764 A1 | 3/2011 | | |

OTHER PUBLICATIONS

Chinese Office Action dated Aug. 5, 2015 for corresponding CN201280073439.6.

Japanese Office Action for Application No. JP 2014-518151 dated Jan. 5, 2016.

* cited by examiner

_(1)_

WINDING DEVICE

RELATED APPLICATIONS

The present invention is a U.S. National Stage under 35 USC 371 patent application, claiming priority to Serial No. PCT/JP2012/063957, filed on 30 May 2012; the entirety of which is incorporated herein by reference.

TECHNICAL FIELD

The present invention relates to a winding device that winds a bonding cord around a bead ring to bond a winding initiating end and a winding terminating end of a wire when manufacturing bead rings by drawing wires.

BACKGROUND ART

Patent document 1 discloses the structure of a prior art example of such type of a winding device. The winding device of the prior art includes a feeding roller and a rotor. The feeding roller feeds an annular bead ring, which has been formed by drawing a wire, in a circumferential direction. The rotor rotates past an inner side and an outer side of the bead ring. A guide roller is provided on the rotor to guide a bonding cord. A holder is provided beside the rotor to hold an initiating end of the bonding cord in a releasable manner. The holder can be moved toward and away from a position proximate to the rotation center of the rotor.

When the holder, which is holding the initiating end of the bonding cord, is located at a position proximate to the rotation center of the rotor, the rotor is rotated. Further, the bead ring is fed in the circumferential direction by the feeding roller. As a result, the guide roller on the rotor guides the bonding cord to wind the bonding cord around the bead ring, which bonds a winding initiating end and a winding terminating end of the wire so that they do not unwind.

SUMMARY OF THE INVENTION

Problems that are to be Solved by the Invention

In the winding device of the prior art, when wound around the bead ring, the bonding cord is guided by only the guide roller when the rotor rotates. Thus, when the cross-sectional shape of the bead ring is a polygon, such as a tetragon, the bonding cord cannot be wound in contact with the bead ring. More specifically, the bonding cord curves and does not contact the sides between adjacent corners in the cross-section of the bead ring. Thus, the winding initiating end and the winding terminating end of the wire may not be bonded tightly and firmly.

The present invention focuses on the shortcoming of the prior art. It is an object of the present invention to provide a winding device that can wind a bonding cord in contact with a bead ring to tightly and firmly bond a winding initiating end and a winding terminating end of a wire even if the bead ring has a polygonal cross-section.

Means for Solving the Problems

To achieve the above object, the present invention provides a winding device characterized by a rotor that rotates past an inner side and an outer side of an annular bead ring, which is fed in a circumferential direction, while holding a bonding cord to wind the bonding cord around the bead ring. The rotor includes a pushing member that elastically pushes the bonding cord against the bead ring.

Accordingly, in the winding device of the present invention, when the rotor rotates, the bonding cord is wound while pushed against the bead ring by the pushing member. Thus, even if the cross-sectional shape of the bead ring is a polygon, such as a tetragon, the bonding cord is wound around the bead ring while kept in contact with the bead ring and without separating from the bead ring, and the winding initiating end and the winding terminating end of a wire are bonded tightly and firmly.

Effect of the Invention

As described above, the present invention succeeds in winding a bonding cord in contact with a bead ring to tightly and firmly bond a winding initiating end and a winding terminating end of a wire even if the bead ring has a polygonal cross-section.

DETAILED DESCRIPTION

A winding device according to one embodiment of the present invention will now be described with reference to FIGS. 1 to 7.

Figure 2:
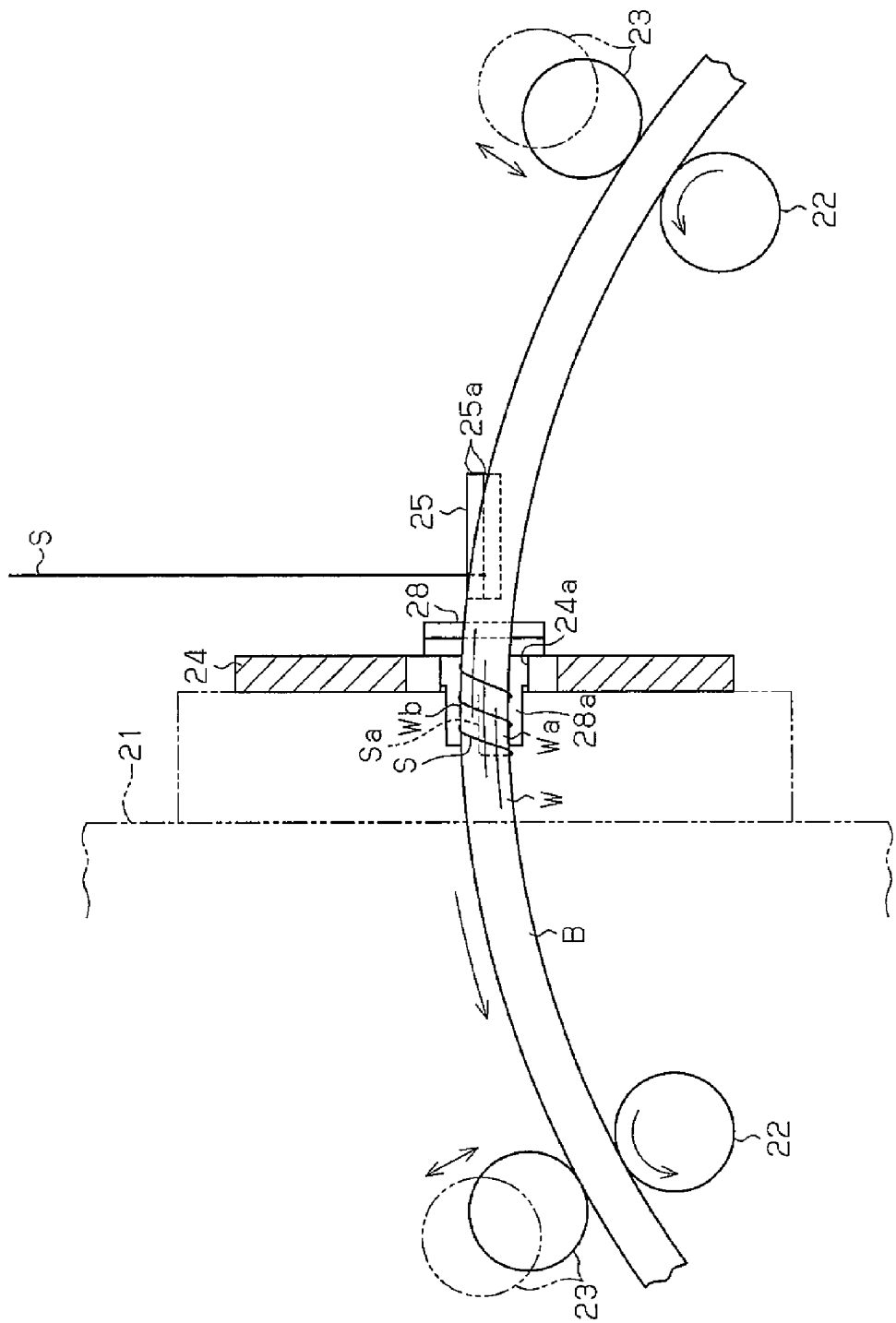
FIG. 2 is a side view of the main portion of the winding device shown in FIG. 1.
Figure 5:
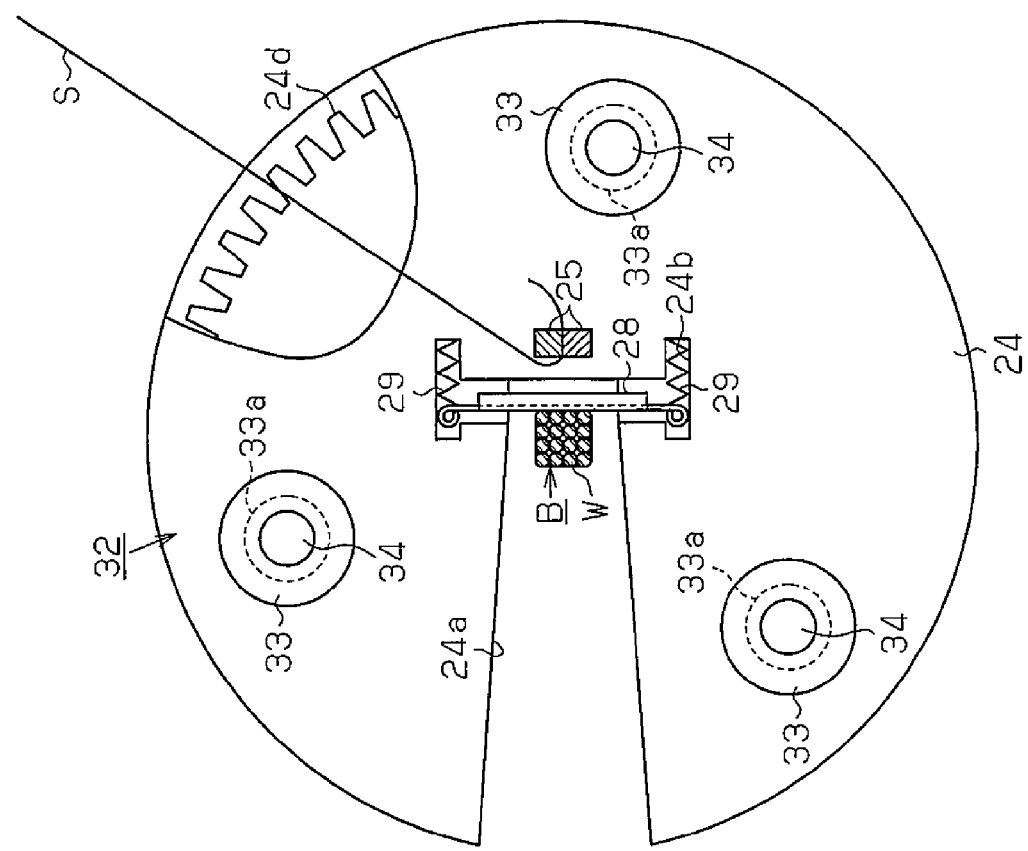
FIG. 5 is a front view of the main portion of the winding device shown in FIG. 1, illustrating an operation for winding a bonding cord around a bead ring.

As shown in FIGS. 2 and 5, a bead ring B is formed to be annular and have a polygonal cross-section, such as a substantially tetragonal cross-section, by drawing a wire W into an arrangement of columns and rows.

As shown in FIG. 2, a device frame 21 supports feeding rollers 22 and 23, which feed the bead ring B in a circumferential direction. When the bead ring B is clamped between the feeding rollers 22 and 23, rotation of the feeding rollers 22 and 23 feed the bead ring B in the counterclockwise direction as viewed in FIG. 2.

Figure 1:
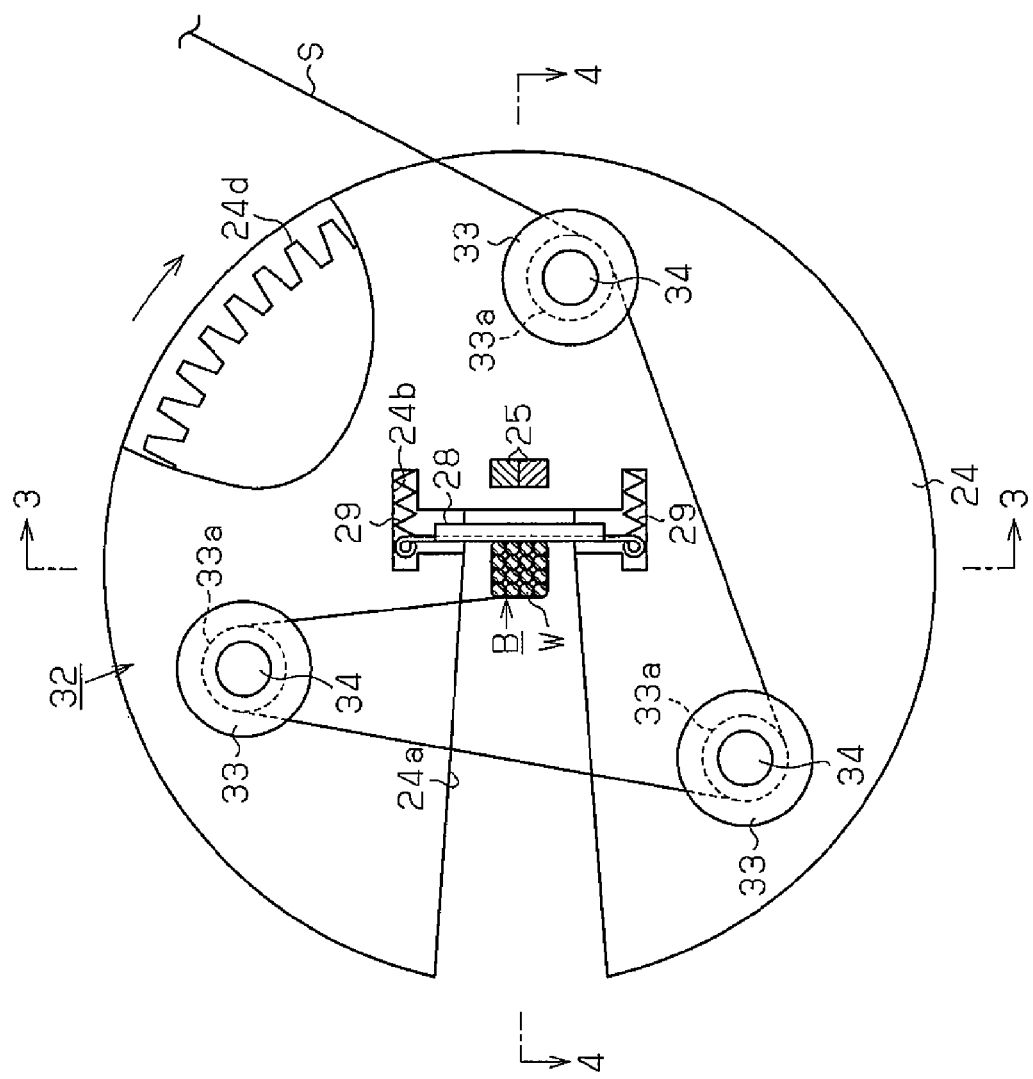
FIG. 1 is a front view of a main portion of a winding device according to one embodiment of the present invention.

The device frame 21 supports a disk-shaped rotor 24 that spirally winds a bonding cord S around the bead ring B. The rotor 24 is rotatable in one direction about its center. The rotor 24 is supported by support rollers (not shown), which contact the circumference of the rotor 24. As shown in FIG. 1, a ring-shaped gear 24d is fixed to the side surface of the rotor 24. A gear (not shown) is engaged with the gear 24d to apply rotation force to the rotor 24.

The rotor 24 includes an insertion groove 24a, which extends in the radial direction of the rotor 24. The bead ring B is inserted into the insertion groove 24a so that the rotor 24 extends across the bead ring B. The insertion groove 24a extends from a peripheral portion of the rotor 24 to beyond the center of the rotor 24. Accordingly, the center of the rotor 24 is located in the insertion groove 24a, and the rotor 24 rotates past the inner side and outer side of the bead ring B in one direction about its center. In other words, the rotor 24 rotates in one direction about an axis extending along the feeding direction of the bead ring B. As shown in FIG. 5, the side surface of the rotor 24 opposite to the one provided with the gear 24d includes a recess 24b, which is generally H-shaped and continuous with the insertion groove 24a.

As shown in FIG. 2, a gripping member 25, which includes two gripping pieces 25a, is supported by the device frame 21. The gripping member 25 is located in the vicinity of the rotor 24 and the bead ring B at the upstream side of the rotor 24 in the feeding direction of the bead ring B. The gripping member 25 grips the initiating end of a bonding cord S in a releasable manner.

Figure 3:
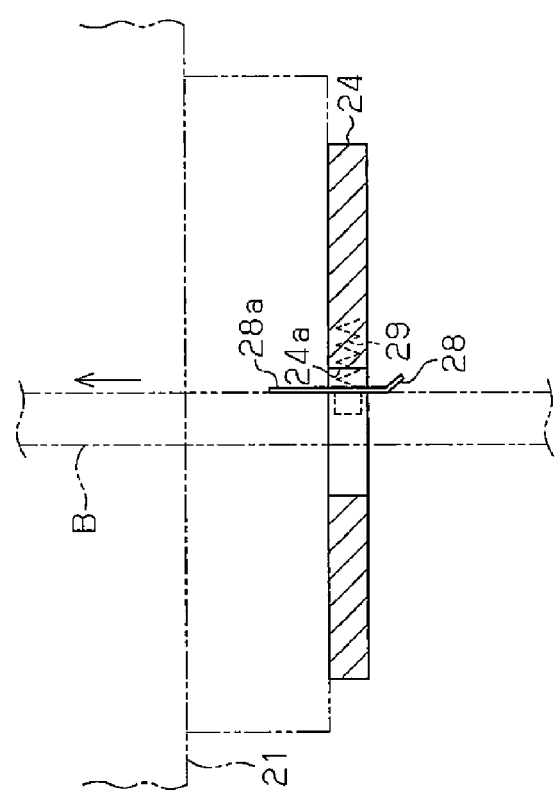
FIG. 3 is a cross-sectional view, in part, taken along line 3-3 in FIG. 1.
Figure 4:
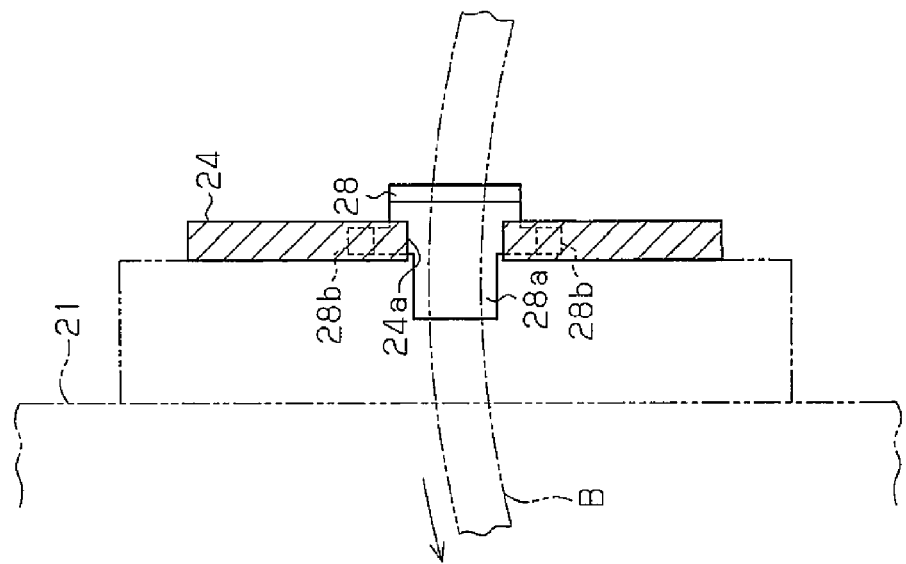
FIG. 4 is a cross-sectional view, in part, taken along line 4-4 in FIG. 1.

As shown in FIG. 1, a pushing member 28, which is formed by a plate spring, is arranged in the insertion groove 24a of the rotor 24. The pushing member 28 is movable in the extending direction of the insertion groove 24a (sideward direction as viewed in FIG. 1). As shown in FIG. 2, the pushing member 28 is located at a position separated from the gripping member 25 in the feeding direction of the bead ring B, more specifically, at the downstream side of the gripping member 25 in the feeding direction of the bead ring B (left side of gripping member 25 as viewed in FIG. 2). As shown in FIGS. 3 and 4, the pushing member 28 includes a plate-like pushing portion 28a, which contacts the bead ring B. Supporting portions 28b project from the two sides of the pushing portion 28a. The supporting portions 28b are located in the recess 24b of the rotor 24 and movable in the recess 24b.

Two coil springs 29 are arranged in the recess 24b. The coil springs 29 contact the supporting portions 28b of the pushing member 28 to urge and move the pushing portion 28a toward the bead ring B. Thus, the pushing member 28 elastically pushes the bonding cord S, which is wound around the bead ring B when the rotor 24 rotates, against the bead ring B. When the pushing member 28 and the coil springs 29 are accommodated in the recess 24b of the rotor 24, a cover (not shown) is fastened by screws to the side surface of the rotor 24 to cover the opening of the recess 24b.

As shown in FIG. 1, three restriction rollers 33, each supported by a shaft 34 on the side surface of the rotor 24, move the bonding cord S around the bead ring B. Each roller 33 includes a small diameter portion 33a that restricts the bonding cord S to a position located at the downstream side of the gripping member 25 in the feeding direction of the bead ring B.

The operation of the winding device having the structure described above will now be described.

When winding the bonding cord S around the bead ring B with the winding device, the bonding cord S is supplied, with tension applied to the bonding cord S, from a supplying source (not shown) to the winding device. As shown in FIGS. 2 and 5, the initiating end of the bonding cord S is gripped by the gripping member 25. Accordingly, the initiating end of the bonding cord S is located at the upstream side of the rotor 24 in the feeding direction of the bead ring B, as shown in FIG. 2. Further, the bead ring B, which is formed by drawing a wire W, is inserted into the insertion groove 24a of the rotor 24. Here, as shown in FIG. 2, two sides of a portion including the winding initiating end Wa and the winding terminating end Wb of the wire W in the bead ring B are clamped between the feeding rollers 22 and 23.

Under this situation, the rotor 24 is rotated in the clockwise direction as viewed in FIG. 5. At the same time, the feeding rollers 22 and 23 are rotated to feed the bead ring B in the counterclockwise direction as viewed in FIG. 2. This starts winding of the bonding cord S around the bead ring B with the location of the bonding cord S restricted by the small diameter portions 33a of the restriction rollers 33, more specifically, with the location of the bonding cord S restricted at the downstream side of the initiating end of the bonding cord S, which is gripped by the gripping member 25, in the feeding direction of the bead ring B. Accordingly, the winding of the bonding cord S around the bead ring B starts from a position located at the downstream side of the gripping member 25 in the feeding direction of the bead ring B. Further rotation of the rotor 24 winds the tense bonding cord S around the bead ring B.

Figure 7:
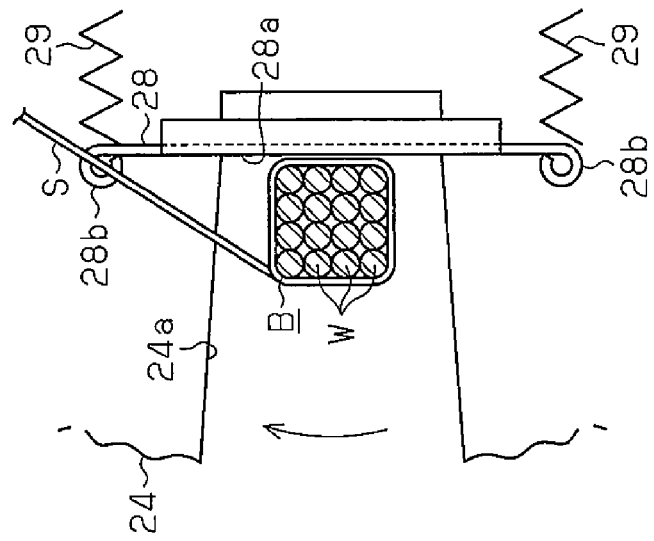
FIG. 7 is an enlarged partial front view of the winding device shown in FIG. 1, illustrating a situation in which the pushing member pushes the bonding cord when the bonding cord is wound.
Figure 6:
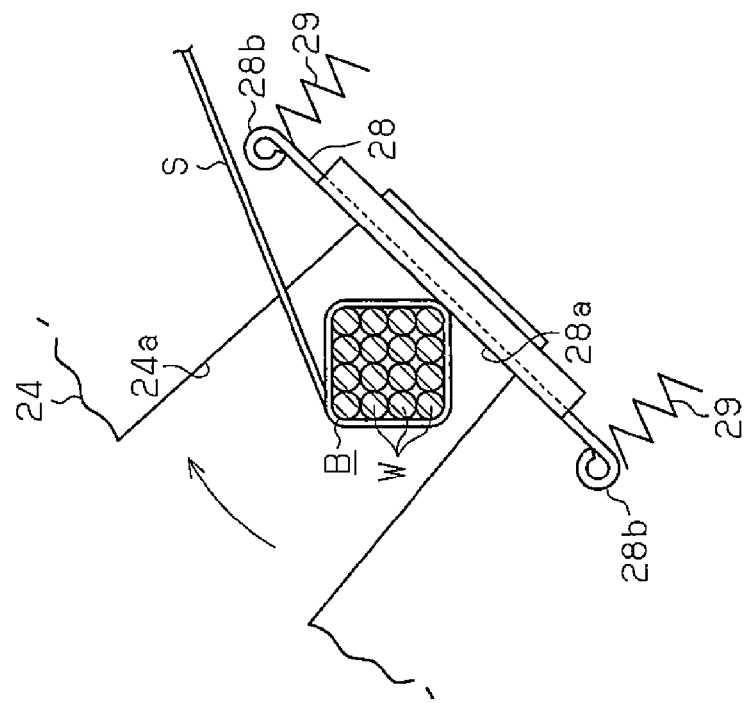
FIG. 6 is an enlarged partial front view of the winding device shown in FIG. 1, illustrating a situation in which a pushing member pushes the bonding cord when the bonding cord is wound.

As shown in FIGS. 6 and 7, the pushing member 28, which is urged by the springs 29, pushes the bonding cord S against the bead ring B at a position located at a slightly downstream side of the position where the small diameter portions 33a restricts the bonding cord S in the feeding direction of the bead ring B. Under this situation, the pushing member 28 rotates around the bead ring B as the rotor 24 rotates. Thus, the bonding cord S is wound around the bead ring B in contact with the bead ring B and without separating from the bead ring B.

In this manner, when the rotor 24 is rotated a predetermined number of times (about once), the initiating end of the bonding cord S is released from the gripping member 25. As a result, the initiating end Sa of the bonding cord S, which has been separated from the gripping member 25, is drawn toward the inner side of the bonding cord S on the bead ring B as the bead ring B is fed and the rotor 24 rotates, as shown by the broken lines in FIG. 2. When the supplied length of the bonding cord S reaches a predetermined value as the rotor 24 rotates (e.g., ten times), the bonding cord S is cut by a cutter (not shown).

Then, the rotor 24 is further rotated to wind the bonding cord S around the bead ring B until reaching the cut end as the pushing member 28 pushes the bonding cord S. This bonds the winding initiating end Wa and the winding terminating end Wb of the wire W without being displaced or moved away from each other. Under this situation, the rotation of the rotor 24 is stopped and the feeding of the bead ring B is stopped to end the winding of the bonding cord S. Then, the feeding rollers 22 and 23 unclamp the bead ring B, which undergoes the next process.

The present embodiment has the advantages described below.

(1) The winding device of the present embodiment includes the rotor 24 that rotates past the inner side and the outer side of the annular bead ring B, which is fed in the circumferential direction, while holding the bonding cord S to wind the bonding cord S around the bead ring B. The rotor 24 includes the pushing member 28 that elastically pushes the bonding cord S against the bead ring B. Thus, when the rotor 24 rotates, the bonding cord S is pushed by the pushing member 28 when wound around the bead ring B. Consequently, even when the cross-section of the bead ring B has the shape of a polygon, such as a tetragon, the bonding cord S is wound around the bead ring B while kept in contact with the bead ring B and without separating from the bead ring B, and the winding initiating end Wa and the winding terminating end Wb of the wire W are bonded tightly and firmly without any gaps.

(2) The gripping member 25 of the winding device is located at the upstream side of the position where the roller 33 guides the bonding cord S in the feeding direction of the bead ring B. Accordingly, the winding of the bonding cord S is performed at a position located at a downstream side of the initiating end of the bonding cord S, which is gripped by the gripping member 25, in the feeding direction of the bead ring B. Thus, the initiating end of the bonding cord S when released from the gripping member 25 during the winding is pushed against the bead ring B by the pushing member 28 and drawn into the inner side of the bonding cord S on the bead ring B. This prevents unwinding of the initiating end of the bonding cord S.

Modified Examples

The present embodiment may be modified as described below.

The number of the restriction rollers 33 may be changed.

A mechanism may be used to adjust the position of the feeding rollers 22 and 23 in accordance with the diameter of the bead ring B.

DESCRIPTION OF THE REFERENCE CHARACTERS

21: device frame, 24: rotor, 25: gripping member, 28: pushing member, 28*a*: pushing portion, B: bead ring, W: wire, S: bonding cord.

The invention claimed is:

1. A winding device comprising a rotor that rotates past an inner side and an outer side of an annular bead ring, which is fed in a circumferential direction, while holding a bonding cord to wind the bonding cord around the bead ring, wherein the rotor includes a pushing member that elastically pushes the bonding cord against the bead ring, and wherein the pushing member includes a pushing portion that is formed by a plate spring and brought into contact with the bonding cord.

2. The winding device according to claim 1, further comprising:

a gripping member that grips an initiating end of the bonding cord in a releasable manner, wherein the gripping member is provided in a device frame that supports the rotor; and a restriction roller that restricts the bonding cord to a position located at a downstream side of the gripping member in a feeding direction of the bead ring.

* * * * *